US011436787B2

(12) United States Patent
Wang et al.

(10) Patent No.: US 11,436,787 B2
(45) Date of Patent: Sep. 6, 2022

(54) RENDERING METHOD, COMPUTER PRODUCT AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuefeng Wang, Beijing (CN); Yukun Sun, Beijing (CN); Bin Zhao, Beijing (CN); Lixin Wang, Beijing (CN); Xi Li, Beijing (CN); Jianwen Suo, Beijing (CN); Wenyu Li, Beijing (CN); Qingwen Fan, Beijing (CN); Jinbao Peng, Beijing (CN); Yuanjie Lu, Beijing (CN); Yali Liu, Beijing (CN); Chenru Wang, Beijing (CN); Jiankang Sun, Beijing (CN); Hao Zhang, Beijing (CN); Lili Chen, Beijing (CN); Jinghua Miao, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 734 days.

(21) Appl. No.: 16/335,350

(22) PCT Filed: Sep. 6, 2018

(86) PCT No.: PCT/CN2018/104350
§ 371 (c)(1),
(2) Date: Mar. 21, 2019

(87) PCT Pub. No.: WO2019/184251
PCT Pub. Date: Oct. 3, 2019

(65) Prior Publication Data
US 2021/0358200 A1    Nov. 18, 2021

(30) Foreign Application Priority Data

Mar. 27, 2018    (CN) .......................... 201810260593.3

(51) Int. Cl.
*G06T 15/20* (2011.01)
*H04N 13/383* (2018.01)
(Continued)

(52) U.S. Cl.
CPC ............ *G06T 15/20* (2013.01); *G06T 15/005* (2013.01); *H04N 13/344* (2018.05); *H04N 13/383* (2018.05); *G06T 2210/36* (2013.01)

(58) Field of Classification Search
CPC ... G06T 15/20; G06T 15/005; G06T 2210/36; H04N 13/383; H04N 13/344
See application file for complete search history.

(56) References Cited

U.S. PATENT DOCUMENTS 5,574,836 A * 11/1996 Broemmelsiek ..... H04N 13/279
                                                   348/E13.019
5,764,231 A *  6/1998 Ray ..................... H04N 1/00201
                                                   345/419
(Continued)

FOREIGN PATENT DOCUMENTS

CN    103745501 A    4/2014
CN    103905688 A    7/2014
(Continued)

OTHER PUBLICATIONS

Office Action dated Aug. 25, 2020, issued in counterpart CN Application No. 201810260593.3, with English translation (27 pages).
(Continued)

*Primary Examiner* — Charles L Beard
(74) *Attorney, Agent, or Firm* — WHDA, LLP

(57) ABSTRACT

An image rendering method for a computer product coupled to a display apparatus may include rendering an entire
(Continued)

display region of the display apparatus with a first rendering mode to generate a first rendering mode sample image, determining a target region in the entire display region, rendering the target region with a second rendering mode to generate a second rendering mode sample image, and transmitting data of the first rendering mode sample image and the second rendering mode sample image. The second rendering mode comprises at least a value of an image rendering feature that is higher than that of the first rendering mode.

18 Claims, 8 Drawing Sheets

(51) Int. Cl.
    *H04N 13/344* (2018.01)
    *G06T 15/00* (2011.01)

(56) References Cited

U.S. PATENT DOCUMENTS

| | | | | |
|---|---|---|---|---|
| 5,999,187 | A * | 12/1999 | Dehmlow | G06F 15/00 382/199 |
| 6,300,957 | B1 * | 10/2001 | Rao | G06T 11/206 345/441 |
| 6,937,272 | B1 * | 8/2005 | Dance | G06F 1/1626 348/333.05 |
| 8,956,227 | B2 * | 2/2015 | Suzuki | A63F 13/5258 463/31 |
| 9,737,814 | B2 * | 8/2017 | Suzuki | A63F 13/655 |
| 9,948,919 | B2 * | 4/2018 | Jin | H04N 5/23267 |
| 10,108,261 | B1 * | 10/2018 | Hall | G06F 3/013 |
| 10,488,921 | B1 * | 11/2019 | Ouderkirk | G06F 1/163 |
| 10,520,742 | B1 * | 12/2019 | Sulai | G06F 3/013 |
| 10,572,764 | B1 * | 2/2020 | Bastani | H04N 13/383 |
| 10,645,370 | B2 * | 5/2020 | Chernobieff | G06T 15/00 |
| 10,771,774 | B1 * | 9/2020 | Melakari | H04N 13/106 |
| 10,861,362 | B2 * | 12/2020 | Yoo | H04N 13/344 |
| 10,997,773 | B2 * | 5/2021 | Choubey | G06F 3/013 |
| 11,086,396 | B2 * | 8/2021 | Kim | G06F 3/012 |
| 11,113,880 | B1 * | 9/2021 | LaFayette | G06T 17/205 |
| 11,210,807 | B2 * | 12/2021 | Young | G06T 11/20 |
| 2004/0010803 | A1 * | 1/2004 | Berstis | H04N 5/23293 348/E13.047 |
| 2007/0139433 | A1 * | 6/2007 | Anderson | G09G 5/02 345/582 |
| 2008/0180443 | A1 * | 7/2008 | Mihara | H04N 13/128 348/E13.022 |
| 2010/0110069 | A1 * | 5/2010 | Yuan | G06T 15/20 345/419 |
| 2011/0102425 | A1 | 5/2011 | Ohta | |
| 2011/0183301 | A1 * | 7/2011 | Turner | G09B 9/302 434/43 |
| 2011/0273369 | A1 | 11/2011 | Imai et al. | |
| 2014/0055578 | A1 * | 2/2014 | Wu | G06F 3/04845 348/51 |
| 2014/0063077 | A1 * | 3/2014 | Wetzstein | G09G 3/36 345/102 |
| 2014/0185098 | A1 | 7/2014 | Araya | |
| 2015/0109532 | A1 | 4/2015 | Lewis et al. | |
| 2015/0287165 | A1 * | 10/2015 | Berghoff | G06T 3/40 345/426 |
| 2015/0287166 | A1 * | 10/2015 | Cerny | G06T 17/20 345/423 |
| 2015/0287167 | A1 * | 10/2015 | Cerny | G06T 17/20 345/423 |
| 2015/0339844 | A1 * | 11/2015 | Liu | H04N 13/279 345/419 |
| 2016/0086379 | A1 * | 3/2016 | Sadi | G02B 27/0093 345/633 |
| 2016/0163092 | A1 * | 6/2016 | Sellin | G06T 15/20 345/419 |
| 2016/0191910 | A1 * | 6/2016 | von und zu Liechtenstein | H04N 13/383 348/43 |
| 2016/0252739 | A1 * | 9/2016 | Wei | H04N 13/31 359/463 |
| 2016/0307297 | A1 * | 10/2016 | Akenine-Moller | G06T 15/005 |
| 2016/0337630 | A1 * | 11/2016 | Raghoebardajal | A63F 13/5252 |
| 2016/0350965 | A1 * | 12/2016 | Lum | G06T 11/40 |
| 2016/0366392 | A1 * | 12/2016 | Raghoebardajal | H04N 19/167 |
| 2017/0004648 | A1 * | 1/2017 | Li | G06F 3/04842 |
| 2017/0011492 | A1 * | 1/2017 | Thunström | G06F 3/013 |
| 2017/0078651 | A1 * | 3/2017 | Russell | G02B 27/0172 |
| 2017/0090562 | A1 * | 3/2017 | Gustafsson | G06F 3/012 |
| 2017/0118540 | A1 * | 4/2017 | Thomas | H04N 21/440263 |
| 2017/0124760 | A1 * | 5/2017 | Murakawa | G06T 11/40 |
| 2017/0169602 | A1 * | 6/2017 | Blackmon | G06F 3/013 |
| 2017/0171533 | A1 * | 6/2017 | Benitez | H04N 13/383 |
| 2017/0178395 | A1 * | 6/2017 | Pharr | G06T 15/503 |
| 2017/0236252 | A1 * | 8/2017 | Nguyen | G06T 15/00 345/419 |
| 2017/0237974 | A1 * | 8/2017 | Samec | G06F 3/04842 348/53 |
| 2017/0287112 | A1 * | 10/2017 | Stafford | G06F 3/013 |
| 2017/0287447 | A1 * | 10/2017 | Barry | G02B 27/0093 |
| 2017/0289219 | A1 * | 10/2017 | Khalid | H04N 21/234345 |
| 2017/0316601 | A1 * | 11/2017 | Kakarlapudi | G06T 15/005 |
| 2017/0323475 | A1 * | 11/2017 | Moreton | G06T 15/30 |
| 2018/0047129 | A1 | 2/2018 | Cerny et al. | |
| 2018/0061084 | A1 | 3/2018 | Mitchell et al. | |
| 2018/0061117 | A1 * | 3/2018 | Pohl | G06T 3/0012 |
| 2018/0061122 | A1 * | 3/2018 | Clarberg | G06T 15/04 |
| 2018/0068640 | A1 * | 3/2018 | Martin | G09G 5/391 |
| 2018/0077451 | A1 * | 3/2018 | Yip | H04N 13/111 |
| 2018/0081178 | A1 * | 3/2018 | Shpunt | H04N 13/38 |
| 2018/0107271 | A1 * | 4/2018 | Woo | G06T 15/10 |
| 2018/0165830 | A1 * | 6/2018 | Danieau | G06T 19/006 |
| 2018/0167613 | A1 * | 6/2018 | Hannuksela | H04N 13/207 |
| 2018/0180733 | A1 * | 6/2018 | Smits | H04N 13/383 |
| 2018/0189999 | A1 * | 7/2018 | Angelidis | G06T 15/20 |
| 2018/0192022 | A1 * | 7/2018 | Wang | G06T 9/001 |
| 2018/0196509 | A1 * | 7/2018 | Trail | G02B 27/0172 |
| 2018/0220119 | A1 * | 8/2018 | Horvitz | H04N 21/234363 |
| 2018/0224935 | A1 * | 8/2018 | Thunström | G06T 19/20 |
| 2018/0276790 | A1 * | 9/2018 | Mantor | G06T 15/80 |
| 2018/0286105 | A1 * | 10/2018 | Surti | G06F 3/011 |
| 2018/0286106 | A1 * | 10/2018 | Apodaca | G06T 3/40 |
| 2018/0295352 | A1 * | 10/2018 | Ninan | G06F 3/012 |
| 2018/0302556 | A1 * | 10/2018 | Baran | H04N 19/179 |
| 2018/0350032 | A1 * | 12/2018 | Bastani | G06T 19/00 |
| 2018/0350036 | A1 * | 12/2018 | VanReenen | G06T 3/0093 |
| 2018/0357780 | A1 * | 12/2018 | Young | G06T 15/10 |
| 2018/0357794 | A1 * | 12/2018 | Young | G06T 13/80 |
| 2019/0035049 | A1 * | 1/2019 | Backer | G06T 15/005 |
| 2019/0035363 | A1 * | 1/2019 | Schluessler | G06T 15/405 |
| 2019/0102865 | A1 * | 4/2019 | Hensley | G06T 15/60 |
| 2019/0122642 | A1 * | 4/2019 | Morein | G09G 5/391 |
| 2019/0156793 | A1 * | 5/2019 | Sun | G09G 5/391 |
| 2019/0163267 | A1 * | 5/2019 | Hainzl | G06F 3/013 |
| 2019/0236834 | A1 | 8/2019 | Blackmon et al. | |
| 2019/0278090 | A1 * | 9/2019 | Yehezkel | G02B 27/0093 |
| 2019/0287495 | A1 * | 9/2019 | Mathur | G09G 5/391 |
| 2019/0335166 | A1 * | 10/2019 | Copley | G06T 15/08 |
| 2019/0340812 | A1 * | 11/2019 | Fuetterling | G06T 9/00 |
| 2019/0347757 | A1 * | 11/2019 | Selvik | G06T 3/40 |
| 2019/0354173 | A1 * | 11/2019 | Young | G02B 27/0093 |
| 2019/0355091 | A1 * | 11/2019 | Gierach | G06T 15/005 |
| 2020/0005521 | A1 * | 1/2020 | Youngquist | G06T 17/00 |
| 2020/0035040 | A1 * | 1/2020 | Eschricht | G06F 3/012 |
| 2020/0068190 | A1 * | 2/2020 | Cheung | G06T 19/006 |
| 2020/0074716 | A1 * | 3/2020 | Kaplan | H04N 13/344 |
| 2020/0107003 | A1 * | 4/2020 | Phillips | H04N 21/21805 |
| 2020/0111195 | A1 * | 4/2020 | Vlachos | H04N 5/145 |
| 2020/0143516 | A1 * | 5/2020 | Martin | G06F 3/012 |
| 2020/0175751 | A1 * | 6/2020 | Connor | H04N 13/122 |
| 2020/0183166 | A1 * | 6/2020 | Dai | G02B 27/0172 |
| 2020/0213558 | A1 * | 7/2020 | Tuli | G02B 27/0172 |
| 2020/0228774 | A1 * | 7/2020 | Kar | G06T 15/005 |
| 2020/0234407 | A1 * | 7/2020 | Ollila | G06T 3/4053 |
| 2020/0236347 | A1 * | 7/2020 | Ollila | H04N 13/383 |

(56) References Cited

U.S. PATENT DOCUMENTS

| | | | |
|---|---|---|---|
| 2020/0288114 A1* | 9/2020 | Lakshman | H04N 13/351 |
| 2020/0311978 A1* | 10/2020 | Aflaki Beni | H04N 13/239 |
| 2020/0394830 A1* | 12/2020 | Choubey | G06F 3/013 |
| 2020/0413032 A1* | 12/2020 | Lyubarsky | H04N 13/302 |
| 2021/0027541 A1* | 1/2021 | Chao | G06T 7/90 |
| 2021/0049981 A1* | 2/2021 | Seiler | G06T 1/20 |
| 2021/0058612 A1* | 2/2021 | Sun | H04N 13/361 |
| 2021/0086075 A1* | 3/2021 | Cockram | G06T 13/40 |
| 2021/0090323 A1* | 3/2021 | Hazra | G06F 3/013 |
| 2021/0092343 A1* | 3/2021 | Ji | H04N 13/339 |
| 2021/0142443 A1* | 5/2021 | Eble | H04N 21/631 |
| 2021/0166341 A1* | 6/2021 | Bastani | G06T 1/60 |
| 2021/0185294 A1* | 6/2021 | Malaika | H04N 13/194 |
| 2021/0209777 A1* | 7/2021 | Zhao | H04N 21/234 |
| 2021/0258555 A1* | 8/2021 | Lei | H04N 13/344 |
| 2021/0271319 A1* | 9/2021 | Lussier | G06F 3/013 |
| 2021/0272348 A1* | 9/2021 | Berghoff | G06T 15/04 |
| 2021/0360199 A1* | 11/2021 | Oz | G06T 7/73 |
| 2021/0366082 A1* | 11/2021 | Xiao | H04N 13/366 |
| 2021/0366184 A1* | 11/2021 | Leroux | G06T 15/005 |
| 2021/0374918 A1* | 12/2021 | Margolis | H04N 13/344 |
| 2021/0382316 A1* | 12/2021 | Gupta | G06T 11/40 |

FOREIGN PATENT DOCUMENTS

| | | |
|---|---|---|
| CN | 105096905 A | 11/2015 |
| CN | 105659584 A | 6/2016 |
| CN | 107516335 A | 12/2017 |
| CN | 107807732 A | 3/2018 |
| EP | 3 293 723 A1 | 3/2018 |
| WO | 2018/040428 A1 | 3/2018 |

OTHER PUBLICATIONS

International Search Report dated Jan. 3, 2019, issued in counterpart application No. PCT/CN2018/104350. (9 pages).

Office Action dated Feb. 21, 2020, issued in counterpart CN Application No. 201810260593.3, with English translation (25 pages).

Extended (Supplementary)European Search Report dated Nov. 24, 2021, issued in counterpart EP Application No. 18855141.0. (19 pages).

Reexamination Notice dated Feb. 28, 2022, issued in counterpart CN Application No. 201810260593.3, with English Translation. (30 pages).

Office Action dated Apr. 5, 2022, issued in counterpart EP Application No. 18855141.0, with Extended European Search Repot dated Mar. 17, 2022.

\* cited by examiner

RENDERING METHOD, COMPUTER PRODUCT AND DISPLAY APPARATUS

CROSS-REFERENCE TO RELATED APPLICATIONS

This application claims benefit of the filing date of Chinese Patent Application No. 201810260593.3 filed on Mar. 27, 2018, the disclosure of which is hereby incorporated in its entirety by reference.

TECHNICAL FIELD

The present disclosure relates to display technologies, in particular, to an image rendering method, a renderer, a computer product, and a display apparatus.

BACKGROUND

Products of virtual reality (VR), augmented reality (AR), and mixed reality (MR) require the use of a renderer to render an image. Rendering is the process of outputting a two-dimensional image from computing a data model of a virtual three-dimensional scene according to one or more perspective field of views.

As VR/AR/MR technology becomes more and more demanding on display screen resolution, the amount of data information required by the rendering software is also increasing. A high resolution rendering scene requires a faster computation speed of rendering software, a higher consumption of the processor, and a larger volume of data to be transmitted.

BRIEF SUMMARY

An embodiment of the present disclosure provides an image rendering method for a computer product coupled to a display apparatus. The image rendering method may include rendering an entire display region of the display apparatus with a first rendering mode to generate a first rendering mode sample image, determining a target region in the entire display region, rendering the target region with a second rendering mode to generate a second rendering mode sample image, and transmitting data of the first rendering mode sample image and the second rendering mode sample image. The second rendering mode comprises at least a value of an image rendering feature that is higher than that of the first rendering mode.

The image rendering feature may include at least one of image resolution or bit depth. Rendering the entire display region with the first rendering mode may include rendering the entire display region at a first image resolution; rendering the target region with the second rendering mode may include rendering the target region at a second image resolution; and a number of pixels per unit area corresponding to the first image resolution may be about ¼ to ⅓ of a number of pixels per unit area corresponding to the second image resolution.

In one embodiment, determining the target region in the entire display region may include determining a center point of the target region in the entire display region of the display apparatus, determining a ratio of an area of the target region to an area of the entire display region, and obtaining a location of the target region in the entire display region based on the center point of the target region and the ratio of the area of the target region to the area of the entire display region.

In one embodiment, determining the target region in the entire display region includes determining a center point of the entire display region as the center point of the target region, determining the ratio of the area of the target region to the area of the entire display region as 1:n, obtaining a field of view α of an camera for the entire display region, calculating a field of view β of an camera for the target region using an equation below:

$$\tan\left(\frac{\alpha}{2}\right) = \frac{\tan\left(\frac{\beta}{2}\right)}{n},$$

and calculating a location of the target region in the entire display region based on the calculated field of view β of the camera for the target region.

In one embodiment, determining the target region in the entire display region includes determining a user's gaze point in the entire display region as the center point of the target region is, determining the ratio of the area of the target region to the area of the entire display image as 1:n, obtaining coordinates of the gaze point (Zx, Zy); near clipping distance $A_{near}$ and far clipping distance $A_{far}$ of an camera for the entire display region; left field of view $\beta_{left}$, right field angle $\beta_{right}$, top field of view $\beta_{up}$, bottom field of view $\beta_{down}$ of an camera for the target region, obtaining a range of Zx as $-m \leq Zx \leq m$ and a range of Zy, $-m \leq Zy \leq m$ based on the 1:n ratio of area of the target region to the area of the entire display region, obtaining boundary values of the target region according to below equations:

Near clipping distance: $Z_{near} = A_{near}$;
Far clipping distance: $Z_{far} = A_{far}$;
Left boundary of near clipping plane: $Z_{left} = Z_{near} \times \tan \beta_{left} \times 1/n \times ((2 \times Z_x - m)/m)$;
Right boundary of near clipping plane: $Z_{right} = Z_{near} \times \tan \beta_{right} \times 1/n \times ((2 \times Z_x + m)/m)$;
Up boundary of near clipping plane: $Z_{up} = Z_{near} \times \tan \beta_{up} \times 1/n \times ((2 \times Z_y + m)/m)$;
Down boundary of near clipping plane: $Z_{down} = Z_{near} \times \tan \beta_{down} \times 1/n \times ((2 \times Z_y - m)/m)$;

obtaining parameters of projection matrix of the target region based on the obtained boundary values of the target region according to below equations:

$$\begin{cases} x = 2 \times Z_{near} / (Z_{right} - Z_{left}) \\ y = 2 \times Z_{near} / (Z_{up} - Z_{down}) \\ a = (Z_{right} + Z_{left}) / (Z_{right} - Z_{left}) \\ b = (Z_{up} + Z_{down}) / (Z_{up} - Z_{down}) \\ c = -(Z_{far} + Z_{near}) / (Z_{far} - Z_{near}) \\ d = -(2.0 \times Z_{far} \times Z_{near}) / Z_{far} - Z_{near}) \\ e = -1 \end{cases}$$

and obtaining the projection matrix $Z_m$ of the target region based on the obtained parameters of the projection matrix of the target region:

$$Z_m = \begin{pmatrix} x & 0 & a & 0 \\ 0 & y & b & 0 \\ 0 & 0 & c & d \\ 0 & 0 & e & 0 \end{pmatrix}.$$

The ratio of the area of the target region to the area of the entire display region may be about ¼ to ⅓.

Transmitting the data of the first rendering mode sample image and the second rendering mode sample image may include splicing together the first rendering mode sample image and the second rendering mode sample image to obtained a spliced image and transmitting the spliced image.

Splicing the first rendering mode sample image and the second rendering mode sample image may include superimposing the second rendering mode sample image on a corresponding area of the first rendering mode sample image.

The entire display region to be rendered may correspond to a monocular image of a display screen of the display apparatus. The image rendering feature may include at least one of image resolution or bit depth; the image rendering feature of the first rendering mode sample image may be smaller than a display index of a corresponding image of the display screen; and the image rendering feature of the second rendering mode sample image may equal to a display index of the corresponding image of the display screen The image rendering feature may include the image resolution; a number of pixels per unit area corresponding to the first image resolution of the first rendering mode may be smaller than a number of pixels per unit area corresponding to a display resolution of the monocular image of the display screen; and a number of pixels per unit area corresponding to the second image resolution of the second rendering mode may equal to the number of pixels per unit area corresponding to the display resolution of the monocular image of the display screen.

The display apparatus may be a binocular head mounted display apparatus. The first rendering mode sample image may include a first image resolution rendering sample image of a left eye and a first image resolution rendering sample image of a right eye; and the second rendering mode sample image may include a second image resolution rendering sample image of a left eye and a second image resolution rendering sample image of a right eye.

Another example of the present disclosure is a computer product. The computer product may include one or more processors. The one or more processors is configured to implement the image rendering method according to one embodiment of the present disclosure.

The computer product may include a first rendering module and a second rendering module. The first rendering module may be configured to render the entire displaying region of the display apparatus by the first render mode to obtain the first rendering mode sample image. The second rendering module may be configured to render the target region of the entire display region of the display apparatus by the second rendering mode to generate the second rendering mode sample image.

The computer product may further include a data transmission module, the data transmission module may include an image splicing unit and a spliced image transmission unit. The image splicing unit may be configured to splice together the first rendering mode sample image and the second rendering mode sample image and the spliced image transmission unit may be configured to transmit the spliced image to a display screen of the display apparatus.

Another example of the present disclosure is a display apparatus coupling to the computer product according to one embodiment of the present disclosure.

The display apparatus may further include one or more sensors configured to track and determine a user's gaze point. The computer product may be configured to obtain a size of the display screen of the display apparatus, and adjust a size of the first rendering mode sample image to cover the size of the display screen. The display apparatus may be a head mounted display apparatus.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Obviously, the drawings in the following description are only certain embodiments of the present disclosure, and other drawings can be obtained from those skilled in the art without any creative work.

DETAILED DESCRIPTION

Figure 1:
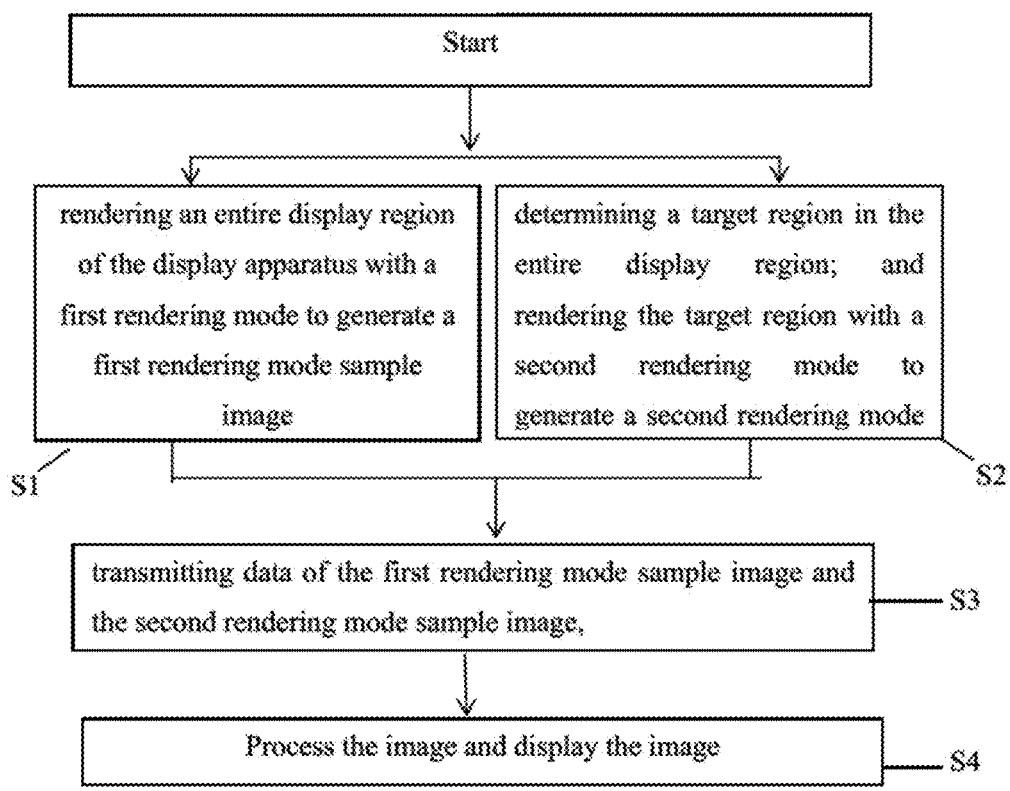
FIG. 1 is a flow chart of a rendering method according to one embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-8. When referring to the figures, like structures and elements shown throughout are indicated with like reference numerals.

The renderer is a core component of some editable computer game systems or interactive real-time image applications, including a 2D image renderer and a 3D image renderer. These systems provide game designers with a variety of tools for writing games, so that game designers can easily and quickly make game programs without starting from scratch.

The renderer pipeline includes parallel processing units that process graphics signals independently of one another in the display chip (GPU). Each stage of the renderer pipeline receives input from the previous stage thereof and outputs to the next stage after the processing is completed. The whole process is to complete one frame rendering. In the early days of the GPU, the processing power thereof was very limited. The rendering pipeline relied heavily on the CPU. The task of the entire pipeline was done by the CPU and GPU. Of course, as the GPU becomes more powerful, the GPU takes on all the tasks in the pipeline, so the concept of rendering pipelines is now equivalent to the GPU rendering pipeline.

Rendering is a process of converting a 3D scene to a 2D image on the screen. First, a virtual scene is created using the renderer. Then, a virtual camera is created as needed, and the orthogonal projection/perspective projection is the projection parameter of this camera. When the program is running, the CPU and GPU will work together to generate the virtual scene, and then the camera will call the rendering pipeline to render according to the set parameters, and the rendered image will be stored at a certain address of the GPU. Finally, the backend handler will take the image from this address, process it, or transfer it to the hardware (display device) via the graphics interface.

Accordingly, an image rendering method according to one embodiment of the present disclosure, as shown in FIG. 1, includes the following:

In step S1, an entire display region is rendered using a first rendering mode to generate a first rendering mode sample image.

In one embodiment, the entire display region to be rendered may be an entire target scene by a renderer who performs the rendering.

In one embodiment, the renderer may construct a scene such as spacing, lighting, and object, etc. based on data of the scene such as attributes data, uniforms data, and texture data etc.

In one embodiment, the renderer may construct the scene through a shader of a graphics processor, a central processor, or other circuits that can perform rendering operation.

In step S2, a region in the entire display region is determined as a target region, and the target region is rendered using a second rendering mode to generate a second rendering mode sample image.

Through steps S1 and S2, different scenes may be rendered by different rendering modes: rendering a partial region of the entire display region (e.g., the above-mentioned "target region") with a high image rendering feature and rendering the non-targeted region with a low image rendering feature.

The sequence of steps S1 and S2 is not limited. In fact, Step S1 can be performed before or after step S2.

In step S3: the first rendering mode sample image generated in step S1 and the second rendering mode sample image generated in step S2 are transmitted.

The second rendering mode is configured to include at least one image rendering feature that is higher than that of the first rendering mode.

In the rendering method according to the embodiment of the present disclosure, the first rendering mode renders the entire display region, and the second rendering mode renders the target region of the entire display region. Therefore, the amount of work created by the embodiments of present disclosure is much less than the amount of work created by performing the second rendering mode to the entire display region in the related art. The amount of data and transmission volume may also be reduced correspondingly. As a result, comparing to the method in the related art, the processing speed of the processor and the data transmission speed according to embodiments of the present disclosure can be significantly improved. That is, the embodiments of the present disclosure significantly improve the computer technology or functionality or capability of the computer technology. Furthermore, a user's demand of real-time screen display is more satisfied.

Alternatively, there may be one or more than one target regions. For example, a targeted region may be selected for each entire display region to be rendered.

In some embodiments, image rendering features include at least one of image resolution or bit depth. For a same image, the workload and the amount of data created by a low-image resolution rendering method is relative less than those by a high-image resolution rendering method, and the workload and the amount of data created by a low bit depth rendering method is relative less than those by a high bit depth rendering method.

The term of "image resolution" described in the present disclosure is conceptually corresponding to a number of pixels contained in a unit area of a display, and is being used to characterize the fineness of the display. For example, comparison of the resolutions can be converted to comparison of the pixel density per unit area, such as dots per inch (DPI) or pixels per inch (PPI) to characterize the pixel density per unit area. For convenience of description, image resolution of the first rendering mode is referred here as a first image resolution, and image resolution of the second rendering mode is referred here as a second image resolution. The image resolution may be selected based on requirement as long as the second image resolution is higher than the first image resolution.

The term of "display resolution" corresponds to a total number of pixels in a display screen. For example, the display resolution may be high-definition (HD) resolution such as full-high definition (FHD) (1080P), quad-high definition (QHD) (2K), 4K, and 5K . . . etc. The display resolution may be non-HD resolutions such as HD (720P), and QHD.

For convenience of description, bit depth of the first rendering mode may be referred to as a first bit depth, and bit depth of the second rendering mode may be referred to as a second bit depth. For example, the second bit depth may be 12 bit, 10 bit, and 8 bit . . . etc. The first bit depth may be 6 bit . . . etc. The examples listed here are only for illustration purposes, and the bit depth may be selected based on requirement as long as the second bit depth is higher than the first bit depth.

In one embodiment, as shown in FIG. 1, in step S3, the data of the first rendering mode sample image and the second rendering mode sample image are transmitted from a processor of the renderer to a display apparatus in order for a driver IC (Driver IC) of the display apparatus to receive and drive the display screen of the display apparatus to display the processed image, as shown in step S4 of FIG. 1. It should be noted that step 4 is not a step of the rendering method provided by embodiments of the present disclosure. It is merely a related process to the rendering method according to the embodiments of the present disclosure.

The rendering method in the embodiments of the present disclosure can realize real-time display of high-quality images satisfying the use's viewing requirements without reducing the output image resolution, bit depth or refreshing rate that can be apparently perceived by the user, thereby avoiding adverse effect on display quality by reducing image quality or refreshing rate.

In the embodiments of the present disclosure, the image rendering method is configured to render the target region at a high-image resolution. However, because the cone concentration of human retina for observing color is different than those for observing the details, the human eye normally can perceive only the details of a gazing area and noticeability of the area beyond 5° of the gaze area is gradually decreased. As such, the above-mentioned image rendering method does not affect the image characteristics such as definition of the image that is being observed by the human eyes. As a result, the excellent quality of the display is ensured.

At present, the related art utilizes a method lowering the refreshing rate to display real-time high quality image. However, this method can cause vertigo. On the other hand, the present disclosure does not lower the refreshing rate, thereby avoiding the problem of vertigo by a user.

In some embodiments, when the image resolution is the image rendering feature, performing the first rendering mode to the entire display region includes rendering the entire display region at the first image resolution. Performing the second rendering mode to the target region includes rendering the target region at the second image resolution. The number of pixels per unit area corresponding to the first image resolution is about ¼ to ⅓ of the number of pixels per unit area corresponding to the second image resolution.

In some embodiments the first image resolution is selected as long as that it is not apparent to the human eyes that the boundary of the target region and the non-target region and the region beyond the target region are blurred. For example, the first image resolution is ¼ to ⅓ of the image resolution of the display screen displaying the image.

Figure 2:
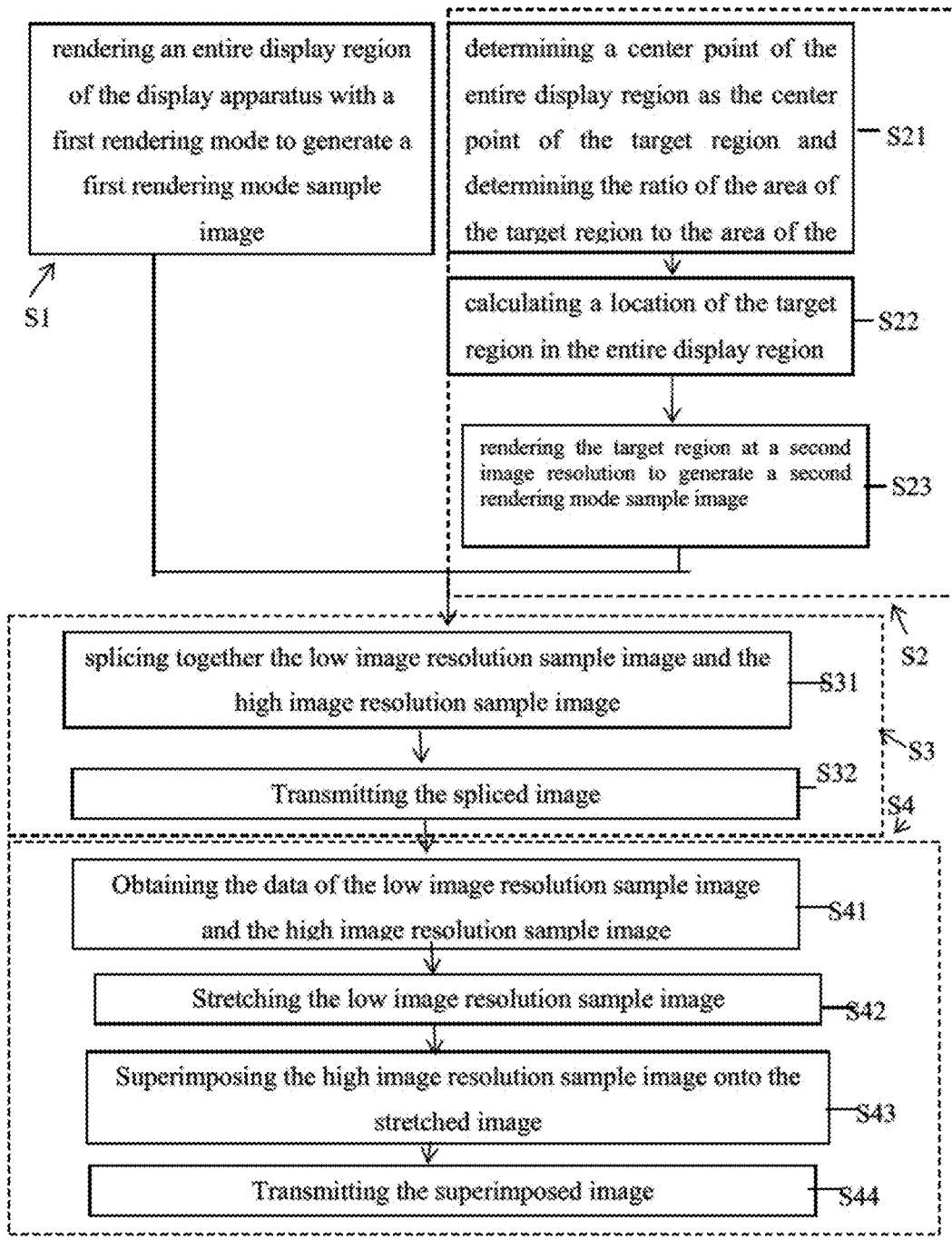
FIG. 2 is a flow chart of a rendering method according to one embodiment of the present disclosure.

In some embodiments, as shown in FIG. 2, determining the target region of the entire display region includes the following steps:

In step S21, a center point of the target region in the entire display region is determined, and a ratio of the area of the target region to the am of the entire display region is determined.

In one embodiment, the center point of the entire display region is determined as the center point of the target region, thereby lowering the amount of computation required to determine a location of the target region. Furthermore, because normally the human eyes first focus on the center of the image when observing an image, setting the center point of an entire display region as the center point of the target region does not cause an adverse effect on the sharpness of an image that is being perceived by the human eyes.

In one embodiment, in order to improve display quality, a user's gaze point on the entire display region is set as the center point of the target region. As such, this method is more targeted when rendering high-quality images of the target region, so that the sharpness perceived by the user viewing the image remains stable.

In one embodiment, an eye-tracking system is used to track a user's gaze point on the entire display region, and based on the result of the eye-tracking system, the center point of the target region is set.

In one embodiment, in the above-mentioned step S21, the ratio of the area of the target region to the area of the entire display region is set so that it is not apparent to the user' eyes that the boundary between the target region and the non-target region and the region beyond the target region are blurred. In one embodiment, the area of the target region is set as about ¼ to ⅓ of the area of the entire display region.

In step S22, a location of the target region in the entire display region is calculated based on the center point of the target region and the ratio of the area of the target region to the am of the entire display region.

In some embodiments, the center point of the entire display region is selected as the center point of the target region and the ratio of the am of the target region to the area of the entire display region is set as 1:n. In the above-mentioned step S22, calculating the location of the target region in the entire display region includes the following:

A field of the view $\alpha$ of the camera for the entire display region is obtained;

A field of view $\beta$ of the camera for the target region is calculated by inputting the parameter n and $\alpha$ into equation (1):

$$\tan\left(\frac{\alpha}{2}\right) = \frac{\tan\left(\frac{\beta}{2}\right)}{n} \quad (1)$$

A location of the target region in the entire display region is calculated using the obtained field of view $\beta$ of the camera for the targeted region.

Here, the term "camera" is a camera of the renderer that provides viewable scenes during the rendering process such as an orthogonal projection camera or a perspective projection camera.

In some embodiments, the user's gaze point on the entire display region is set as the center point of the targeted region, 1:n is set as the ratio of the area of the target region to the area of the entire display region. In the above-mentioned step S22, calculating the location of the target region in the entire display region includes the following:

Coordinates of the user's gaze point ($Z_x$, $Z_y$) are obtained, for example, through the eye-tracking system. Furthermore, near clipping distance $A_{near}$ and far clipping distance $A_{far}$ of the camera for the entire display region, left field of view $\beta_{left}$, right field of view $\beta_{right}$, upper field of view $\beta_{up}$, and bottom field of view $\beta_{down}$ of the camera for the target region are obtained. Based on the 1:n ratio of the area of the target region to the area of the entire display region, a range of $Z_x$, $-m \leq Z_x \leq m$, and a range of $Z_y$, $-m \leq Z_y \leq m$ are obtained.

The boundary values of the target region are obtained by substituting the obtained parameters into equation 2 below:

Near clipping distance: $Z_{near} = A_{near}$

Far clipping distance: $Z_{far} = A_{far}$

Left boundary of near clipping plane: $Z_{left} = Z_{near} \times \tan \beta_{left} \times 1/n \times ((2 \times Z_x - m)/m)$ Right boundary of near clipping plane: $Z_{right} = Z_{near} \times \tan \beta_{right} \times 1/n \times ((2 \times Z_x + m)/m)$ Up boundary of near clipping plane: $Z_{up} = Z_{near} \times \tan \beta_{up} \times 1/n \times ((2 \times Z_y + m)/m)$ Down boundary of near clipping plane: $Z_{down} = Z_{near} \times \tan \beta_{down} \times 1/n \times ((2 \times Z_y - m)/m)$ Parameters of projection matrix of the targeted region are obtained by substituting the obtained boundary values of the targeted region into equation 3:

$$\begin{cases} x = 2 \times Z_{near} / (Z_{right} - Z_{left}) \\ y = 2 \times Z_{near} / (Z_{up} - Z_{down}) \\ a = (Z_{right} + Z_{left}) / (Z_{right} - Z_{left}) \\ b = (Z_{up} + Z_{down}) / (Z_{up} - Z_{down}) \\ c = -(Z_{far} + Z_{near}) / (Z_{far} - Z_{near}) \\ d = -(2.0 \times Z_{far} \times Z_{near}) / Z_{far} - Z_{near}) \\ e = -1 \end{cases} \quad (3)$$

Projection matrix $Z_m$ of the target region is obtained by substituting the obtained parameters of the projection matrix of the targeted region into equation 4:

$$Z_m = \begin{pmatrix} x & 0 & a & 0 \\ 0 & y & b & 0 \\ 0 & 0 & c & d \\ 0 & 0 & e & 0 \end{pmatrix}. \quad (4)$$

It should be noted that once the projection matrix $Z_m$ of the target region has been obtained, a target region may be obtained from anywhere in the entire display region that can display the full target region based on the obtained $Z_m$. Therefore, the above-described method does not limit the target region to be only at the center point of the entire display region, but the target region may be at any location of the entire display region that can display the full targeted region.

In some embodiments, the size and location of the target region is adjusted by adjusting the parameters of the renderer.

For example, the asymmetry issue between the top field of view and the bottom field of view and/or the left field of view and the right field of view may be adjusted by setting a user's gaze point on a display screen of a head-mounted display apparatus as the center point of the target region in order to overcome the discomfort caused by the asymmetry of the left and right field of views and/or the upper and the lower field of views.

The method of obtaining the projection matrix to obtain the target region from any location of the entire display region which can display the full targeted region is also applicable when the center point of the entire display region is set as the center point of the target region.

After the location of the target region is set in the entire display region, high-quality rendering of the target region can start.

In some embodiments, as shown in FIG. 2, step S2 includes the following steps:

In step S23, the target region is rendered using the second rendering mode to obtain a second rendering mode sample image.

In one embodiment, in the above-mentioned step S23, when the image resolution is the image rendering feature, the DPI (pixels per inch) of the target region is selected to be the same as that of the display screen of the display apparatus to calculate the second image resolution.

In some embodiments, in the above-mentioned step S23, when bit depth is the image rendering feature, the bit depth of the target region is selected to be the same as that of the display screen of the display apparatus.

In some embodiment, as shown in FIG. 2, as a possible implementation, step S3 can includes the following steps:

In step S31, the first rendering mode sample image and the second rendering mode sample image are spliced together.

In step S32, the spliced image is transmitted.

In some embodiments, splicing the first rendering mode sample image and the second rendering mode sample image includes superimposing the second rendering mode sample image onto a corresponding region of the first rendering mode sample image.

In some embodiments, when the rendering result of the rendering method of any of the above embodiments is transmitted to the display apparatus, the entire display region to be rendered corresponds to a monocular image of the display screen of the display apparatus.

In some embodiments, an image rendering feature of the first rendering mode sample image is smaller than a display index of the corresponding image of the display screen. An image rendering feature of the second rendering mode sample image is equal to the display index of the corresponding image of the display screen.

In some embodiments, the image rendering feature includes image resolution. The number of pixels per unit area corresponding to the first image resolution of the first rendering mode is less than that corresponding to the monocular display resolution of the display screen. The number of pixels per unit area corresponding to the second image resolution of the second rendering mode is equal to that corresponding to the monocular display resolution of the display screen.

Furthermore, the image display index includes physical display parameters of the display screen such as display resolution, physical bit depth, etc.

In some embodiments, the display apparatus includes a binocular head mounted display apparatus. For a 3D virtual scene, the data being transmitted in step S3 includes a left-eye image and a right-eye image. Therefore, the spliced image includes a first image resolution rendering sample image of the left eye, a second image resolution rendering sample image of the left eye, a first image resolution rendering sample image of the right eye, and a second image resolution sample rendering image of the right eye. The four rendering images can be spliced into one image, which is then transmitted in one time.

In some embodiments, the display apparatus includes a binocular head mounted display apparatus. For a 3D virtual scene and the image rendering features include bit depth, the spliced image includes a first bit depth rendering sample image of the left eye, a second bit depth rendering sample image of the left eye, a first bit depth rendering sample image of the right eye, and a second bit depth rendering sample image of the right eye. The four rendering images can be spliced into one image, which is then transmitted in one time.

In some embodiments, after various regions have been rendered, and various images are spliced and transmitted, the display apparatus displays the received image data, that is, Step S4.

In some embodiments, step S4 as shown in FIG. 2 includes the following steps:

In step S41, the data of the first rendering mode sample image and the second rendering mode sample image is obtained.

In step S42, the size of the first rendering mode sample image is adjusted to the full size of the display screen of the display device.

In step S43, the second rendering mode sample image is superimposed onto the stretched first rendering mode sample image.

In step S44, the superimposed image is transmitted to the display apparatus.

The above-mentioned steps S41-S44 can be performed through an integrated logic operation circuit, for example, a processor of the display apparatus. Through the above-mentioned steps S41-S44, the image displayed on the display screen finally shows that the target region has a higher definition, and the display regions other than the target region have a lower definition. Because the human eyes can perceive only the details of a gaze area and the perception of area that is beyond 5° of the user's gaze area is gradually reduced. Therefore, a user would not be aware of the apparent definition loss of the display image.

Here, it should be noted that, the above-mentioned steps S41-44 can be performed by one or more processors, such processors can be integrated into one computer product (for example, such computer product connects to an external display apparatus), and also can be integrated into a driver controller of the display apparatus having a logical operation processing function.

The following describes a rendering method according to one embodiment of the present disclosure using the image resolution as an example.

Figure 3:
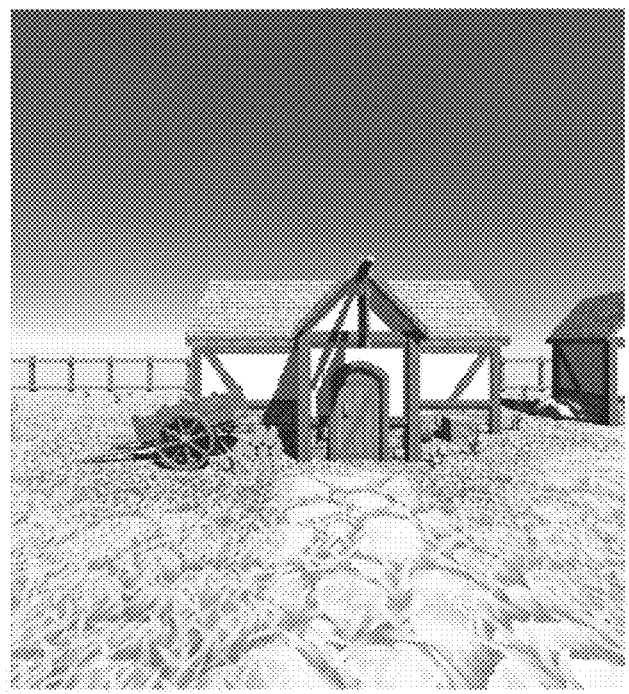
FIGS. 3-6 are pictures of different steps illustrating a rendering method according to one embodiment of the present disclosure.

In step S1', the display resolution of a monocular image of a display screen is 4320×4800. The entire display region is rendered at a display resolution of 1080×1200 to generate a first image resolution sample image having a display resolution of 1080×1200 as shown in FIG. 3. In one embodiment, during the rendering at a low image resolution, the entire display region is compressed ¼ longitudinally and ¼ horizontally. The first image resolution sample image corresponds to the first rendering mode sample image.

Figure 4:
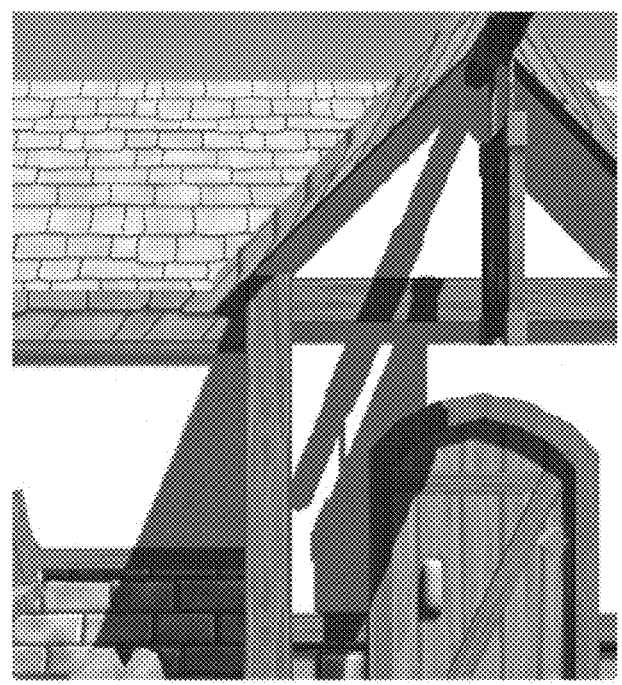

In step S2', a center region of the entire display region is determined as the target region, and the determined targeted region is rendered at a display resolution of 1080×1200 to generate a second image resolution rendering sample image having a 1080×1200 display resolution, as shown in FIG. 4. In one embodiment, in high image resolution rendering, the target region is ¼ horizontally and ¼ vertically of the entire display region. The second image resolution rendering sample image has a same pixel density per unit area as the monocular image of the display screen. The second image resolution rendering corresponds to the second rendering mode sample image.

In one embodiment, in the above-mentioned step S2', the method of calculating the location of the target region includes the following: setting α as the field of view (fov) of the camera for the entire display region; set β as the fov of the camera for the target region, set 1:n (here, n=16) as the ratio of the area of the target region to the area of the entire display region. The relationship between the fovs of the cameras for the targeted region and the entire display region is $$\tan\left(\frac{\alpha}{2}\right) = \frac{\tan\left(\frac{\beta}{2}\right)}{n}.$$

According to the equation, β can be calculated using the known α, and n. In one embodiment, when the fov α of the camera of the entire display region is 90° and the ratio between the am of the target region to the entire display region is 1:16, the fov β of the target region is 28.07°. Furthermore, the position of the target region in the entire display region can be obtained based on the acquired fov β of the target region.

In step S3': the first image resolution rendering sample image that is generated at the low image resolution rendering and the second image resolution rendering sample image that is generated at the high image resolution rendering are spliced together.

Figure 5:
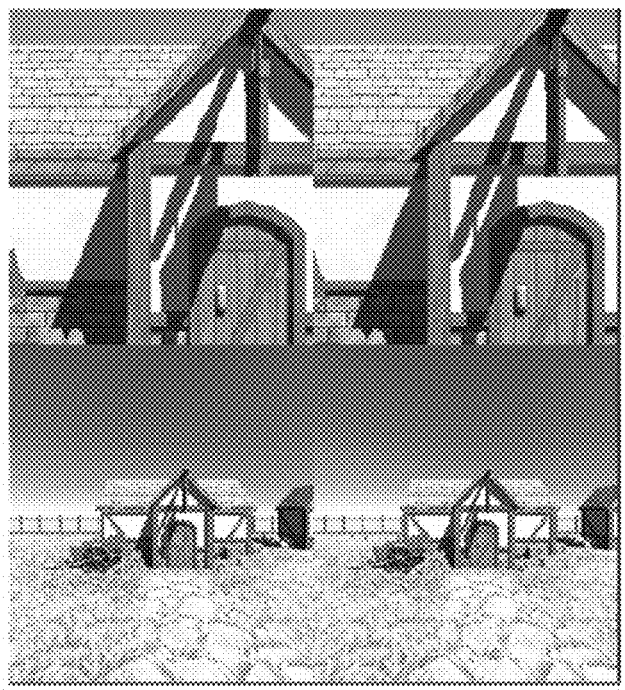

In one embodiment, taking the head mounted display as an example, in the spliced image as shown in FIG. 5, the upper left corner is the image of the target region of the corresponding left eye, that is, the second image resolution rendering sample image of the left eye. The lower left corner is the image of the entire display region of the corresponding left eye, that is, the first image resolution rendering sample image of the left eye. The upper right corner is the image of the target region of the corresponding right eye, that is, the second image resolution rendering sample image of the right eye. The lower right corner is the image of the entire display region of the corresponding right eye, that is, the first image resolution rendering sample image of the right eye. The spliced image is then transmitted. Because the display resolution of each of the four rendering images is 1080×1200, the display resolution of the spliced image is 2160×2400. In comparison, the amount of data being transmitted according to the embodiment of the present disclosure is only ⅛ of the data being transmitted in the method of rendering both the left eye and the right eye images at a high display resolution of 4320×4800. Therefore, the embodiment of the present disclosure provides an image rendering method that significantly reduces the rendering workload and the amount of data being transmitted.

Figure 6:
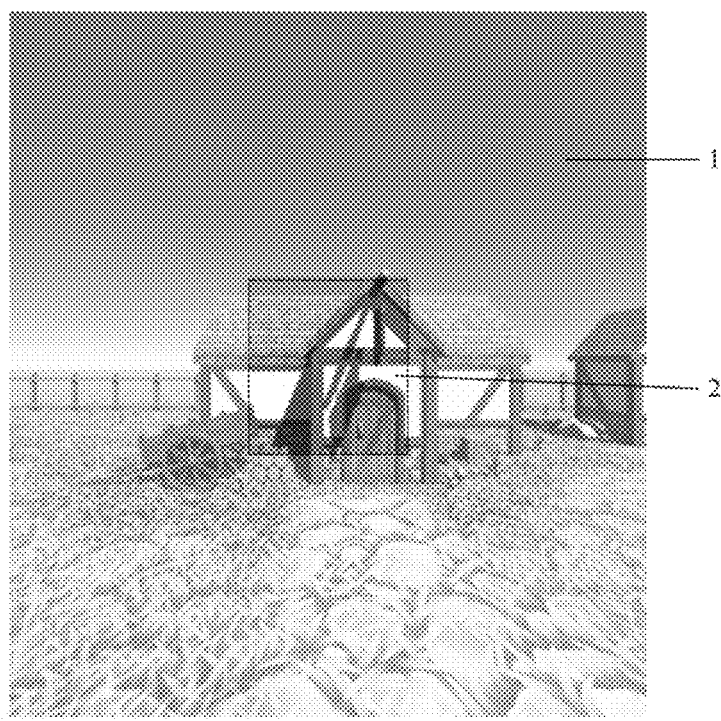

In some embodiments, splicing the images and driving the display screen of the display device to display includes the following steps:

In step S4', the monocular first image resolution rendering sample image is stretched to cover the size of the entire display screen of the display device. Then, the monocular second image resolution rendering sample image is superimposed on the stretched monocular first image resolution rendering sample image to form a monocular image. FIG. 6 shows the final monocular image. The center region of the final monocular image is the target region 2 that has been rendered at a high image resolution, and the region around the center region is the non-target region 1 that has been rendered at a low image resolution.

Figure 7:
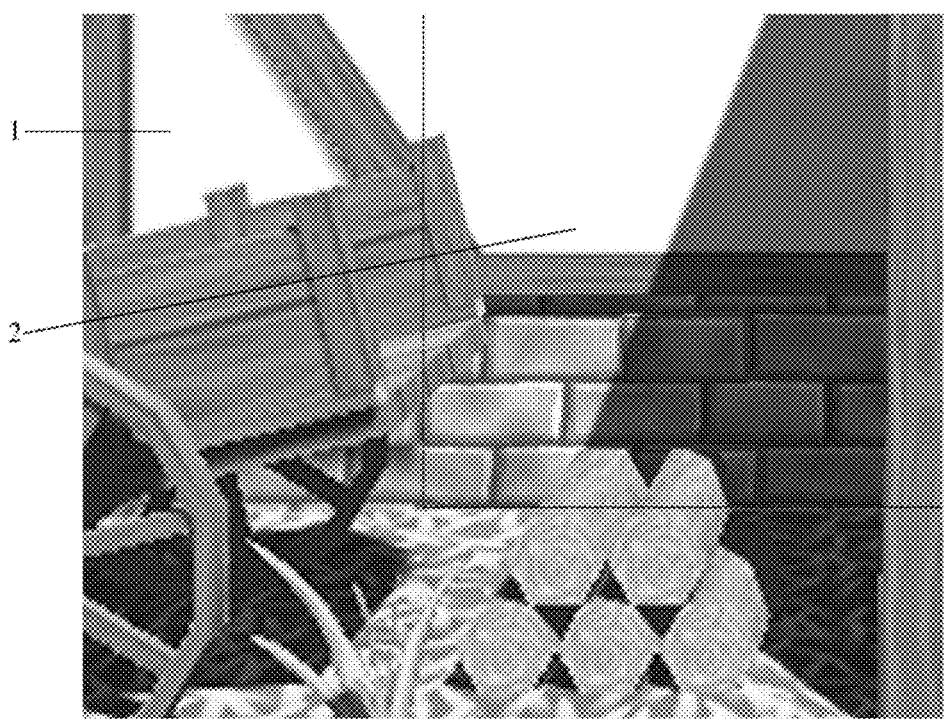
FIG. 7 is a partial enlarged view of FIG. 6 according to one embodiment of the present disclosure.

As shown in FIG. 7 which is a partially zoomed-in image of FIG. 6, it can be clearly seen that the definition of the target region 2 is higher than the definition of the non-targeted region.

In some embodiments, the present disclosure provides a computer program product. Such computer program product performs as a renderer, which is programed to perform computer operating instructions to run on a processor and cause the processor to perform the rendering method of an embodiment of the present disclosure.

Figure 8:
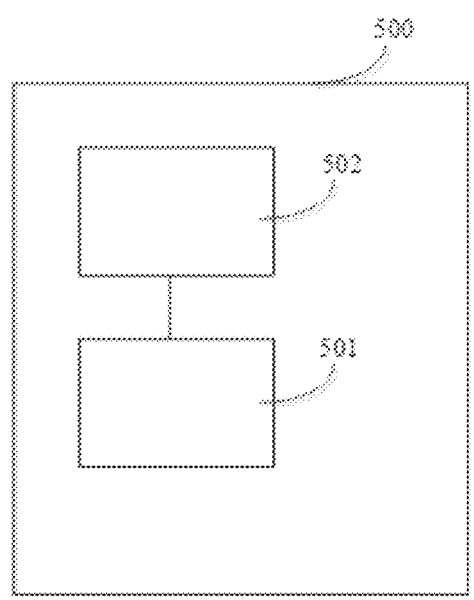
FIG. 8 is a schematic structural diagram of a computer product according to one embodiment of the present disclosure.

As shown in FIG. 8, the renderer includes a first rendering module 10, a second rendering module 20, and a data transmission module 30. The first rendering module 10 and the second rendering module 20 are respectively connected to the data transmission module 30.

In one embodiment, the first rendering module 10 is configured to render the entire displaying region by the first render mode to obtain a first rendering mode sample image. The image rendering steps of the first rendering module can refer to the related description in the foregoing rendering method, and the description thereof is not repeated here.

In one embodiment, the second rendering module 20 is configured to render the target region of the entire display region by the second rendering mode to generate a second rendering mode sample image. The image rendering steps of the second rendering module can refer to the related description in the foregoing rendering method, and the description thereof is not repeated here.

In one embodiment, the data transmission module 30 is configured to transmit data of the first rendering mode sample image and the second rendering mode sample image. As shown in FIG. 8, as a possible implementation, the data transmission module 30 includes: an image splicing unit 31 and a spliced image transmission unit 32. The image splicing unit 31 is configured to splice together the first rendering mode sample image and the second rendering mode sample image. The spliced image transmission unit 32 is configured to transmit the spliced image to the display screen of the display apparatus.

The above-described renderer can reduce the rendering workload and the amount of data to be transmitted. Therefore, the renderer can better satisfy the high-quality display needs and a higher quality of real-time display is realized. In addition, the human eyes would not apparently perceive the reduced definition of the image that has been rendered.

It should be noted that the above-described renderer of an embodiments of the present application can be implemented with a computer software program. The described instruction can also be implemented by integrating into a hardware circuit.

One embodiment of the present disclosure further provides a computer readable storage medium. The foregoing programs may be stored in the computer readable storage medium. When the program is executed, one or more of the foregoing rendering steps are performed.

As shown in FIG. 8, one of the embodiments of the present disclosure provides a computer product 500, which includes one or more processors 502. The one or more processors are configured to execute computer instructions to perform one or more steps of the forgoing rendering method according to one embodiment of the present disclosure.

Optionally, the computer product 500 includes a storage 501 that connects to processor 502. The storage is configured to store commands of the computer instruction.

The storage 501 can be implemented by any type of volatile or non-volatile storage device or a combination therefor, such as static random-access memory (SRAM), electrically erasable programmable read-only memory (EEPROM), erasable programmable read-only memory (EPROM), read-only memory (ROM), magnetic memory, flash memory, disk, or optical disk.

In one embodiment, the processor 502 is a central processing unit (CPU) or a field-programmable logic array (FPGA), a microcontroller (MCU), a digital signal processor (DSP), an application-specific integrated circuit (ASIC), or a graphics processing unit (GPU) having processing power and/or program execution capability. One or more processors may be configured to form a processor group to simultaneously execute the above-described rendering method. Alternatively, some of the processors perform partial steps of the above-described rendering method, and some of the processors perform other partial steps of the above-described rendering methods.

The computer readable program instructions may be loaded onto a computer, other programmable data processing apparatus, or other device to cause a series of operational steps to be performed on the computer, other programmable apparatus or other device to produce a computer implemented process.

The computer product 500 can be connected to various input devices (such as a user-interface, a keyboard, etc.), various output devices (such as speakers, network cards, etc), and display apparatuses to achieve the interaction of computer products with other products or users exchanges, and the description thereof will not be repeated here.

Wherein, the connection may be through a network connection, such as a wireless network, a wired network, and/or any combination of a wireless network and a wired network. The network may include a local area network, the internet, a telecommunications network (Internet of Things), and/or any combination of the above-networks, etc. The wired network can communicate by means of twisted pair, coaxial cable or optical fiber transmission. A wireless communication network such as 3G/4G/5G mobile communication network, Bluetooth, Zigbee or Wi-Fi can be used.

Embodiments of the present disclosure also provide a display apparatus including a display screen. The display apparatus is connected to the computer product of the above embodiments and the data transmission apparatus. The computer acquires and renders the entire display image to be rendered and displayed, the data transmission apparatus receives the output from the computer and transmits the data to the display apparatus to display the image.

The computer product can be separated from the display apparatus or integrated into the display apparatus. The image to be rendered may be provided by the separated computer product or the integrated display apparatus.

In one embodiment, the data transmission apparatus is coupled to the display driving circuit of the display screen. For example, the interface of the data transmission apparatus connects to the connector of the display screen, such as video graphics array (VGA), digital visual interface (DVI), high-definition multimedia interface (HDMI), and display port (DP), etc.

In one embodiment, the data transmission apparatus is a display connection cable connecting to the display screen interface.

In one embodiment, the data transmission apparatus is a display signal transceiver based on wireless implementation, for example, the wireless display transceiver capable of performing display functions such as Air Play, digital living network alliance device (DLNA), Miracast, wireless display (WiDi), and Chromecast.

In one embodiment, the display apparatus connects or integrates with one or more sensors, and the sensor connects to the processor. The sensor is configured to track and determine the gaze point of the user, and the processor acquires the gaze point of the user.

In one embodiment, the processor of the computer product is configured to acquire a size of a display screen and to convert the first rendering mode sample image to cover the size of the display screen.

In some embodiments, the display apparatus is a head mounted display apparatus including, but not limited to, head mounted display apparatus for VR, AR, MR, and CR, etc.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. An image rendering method for a computer product coupled to a display apparatus, comprising:
   rendering an entire display region of the display apparatus with a first rendering mode to generate a first rendering mode sample image;
   determining a target region in the entire display region;
   rendering the target region with a second rendering mode to generate a second rendering mode sample image; and
   transmitting data of the first rendering mode sample image and the second rendering mode sample image, wherein the second rendering mode comprises at least a value of an image rendering feature that is higher than that of the first rendering mode;
   wherein determining the target region in the entire display region comprises:
      determining a center point of the target region in the entire display region of the display apparatus;
      determining a ratio of an area of the target region to an area of the entire display region; and
      obtaining a location of the target region in the entire display region based on the center point of the target region and the ratio of the area of the target region to the area of the entire display region;

wherein determining the target region in the entire display region further comprises:
  determining a center point of the entire display region as the center point of the target region;
  determining the ratio of the area of the target region to the area of the entire display region as 1:n;
  obtaining a field of view α of a camera for the entire display region;
  calculating a field of view β of the camera for the target region using an equation below:

$$\tan\left(\frac{\alpha}{2}\right) = \frac{\tan\left(\frac{\beta}{2}\right)}{n};$$

and
  calculating a location of the target region in the entire display region based on the calculated field of view β of the camera for the target region.

2. The image rendering method according to claim 1, wherein the image rendering feature comprises at least one of image resolution or bit depth.

3. The image rendering method according to claim 2, wherein rendering the entire display region with the first rendering mode comprises rendering the entire display region at a first image resolution; rendering the target region with the second rendering mode comprises rendering the target region at a second image resolution; and a number of pixels per unit area corresponding to the first image resolution is about ¼ to ⅓ of a number of pixels per unit area corresponding to the second image resolution.

4. The image rendering method according to claim 3, wherein the entire display region to be rendered corresponds to a monocular image of a display screen of the display apparatus.

5. The image rendering method according to claim 4, wherein the image rendering feature comprises at least one of image resolution or bit depth;
  the image rendering feature of the first rendering mode sample image is smaller than a display index of a corresponding image of the display screen; and
  the image rendering feature of the second rendering mode sample image equals to a display index of the corresponding image of the display screen.

6. The image rendering method according to claim 4, wherein the image rendering feature comprises the image resolution;
  a number of pixels per unit area corresponding to the first image resolution of the first rendering mode is smaller than a number of pixels per unit area corresponding to a display resolution of the monocular image of the display screen; and
  a number of pixels per unit area corresponding to the second image resolution of the second rendering mode equals to the number of pixels per unit area corresponding to the display resolution of the monocular image of the display screen.

7. The image rendering method according to claim 6, wherein the display apparatus is a binocular head mounted display apparatus;
  the first rendering mode sample image comprises a first image resolution rendering sample image of a left eye and a first image resolution rendering sample image of a right eye; and
  the second rendering mode sample image comprises a second image resolution rendering sample image of a left eye and a second image resolution rendering sample image of a right eye.

8. The image rendering method according to claim 1, wherein the ratio of the area of the target region to the area of the entire display region is about ¼ to ⅓.

9. The image rendering method according to claim 1, wherein transmitting the data of the first rendering mode sample image and the second rendering mode sample image comprises:
  splicing together the first rendering mode sample image and the second rendering mode sample image to obtained a spliced image; and
  transmitting the spliced image.

10. The image rendering method according to claim 9, wherein splicing the first rendering mode sample image and the second rendering mode sample image comprises:
  superimposing the second rendering mode sample image on a corresponding area of the first rendering mode sample image.

11. A computer product, comprising one or more processors, the one or more processors is configured to implement the image rendering method according to claim 1.

12. The computer product of claim 11, comprising a first rendering module and a second rendering module,
  wherein the first rendering module is configured to render the entire displaying region of the display apparatus by the first render mode to obtain the first rendering mode sample image; and
  the second rendering module is configured to render the target region of the entire display region of the display apparatus by the second rendering mode to generate the second rendering mode sample image.

13. The computer product of claim 12, further comprising a data transmission module, the data transmission module comprising an image splicing unit and a spliced image transmission unit;
  wherein the image splicing unit is configured to splice together the first rendering mode sample image and the second rendering mode sample image and the spliced image transmission unit is configured to transmit the spliced image to a display screen of the display apparatus.

14. A display apparatus, coupling to the computer product according to claim 11.

15. The display apparatus according to claim 14, further comprising one or more sensors configured to track and determine a user's gaze point.

16. The display apparatus according to claim 14, wherein the computer product is configured to obtain a size of the display screen of the display apparatus, and adjust a size of the first rendering mode sample image to cover the size of the display screen.

17. The display apparatus according to claim 14, wherein the display apparatus is a head mounted display apparatus.

18. An image rendering method for a computer product coupled to a display apparatus, comprising:
  rendering an entire display region of the display apparatus with a first rendering mode to generate a first rendering mode sample image;
  determining a target region in the entire display region;
  rendering the target region with a second rendering mode to generate a second rendering mode sample image; and
  transmitting data of the first rendering mode sample image and the second rendering mode sample image, wherein the second rendering mode comprises at least a value of an image rendering feature that is higher than that of the first rendering mode;

wherein determining the target region in the entire display region comprises:

determining a center point of the target region in the entire display region of the display apparatus;

determining a ratio of an area of the target region to an area of the entire display region; and obtaining a location of the target region in the entire display region based on the center point of the target region and the ratio of the area of the target region to the area of the entire display region;

wherein determining the target region in the entire display region further comprises:

determining a user's gaze point in the entire display region as the center point of the target region is;

determining the ratio of the area of the target region to the area of the entire display image as 1:n;

obtaining coordinates of the gaze point $(Z_x, Z_y)$;

near clipping distance $A_{near}$ and far clipping distance $A_{far}$ of a camera for the entire display region;

left field of view $\beta_{left}$, right field angle $\beta_{right}$, top field of view $\beta_{up}$, bottom field of view $\beta_{down}$ of the camera for the target region;

obtaining a range of $Z_x$ as $-m \leq Z_x \leq m$ and a range of $Z_y$, $-m \leq Z_y \leq m$ based on the 1:n ratio of area of the target region to the area of the entire display region;

obtaining boundary values of the target region according to below equations:

Near clipping distance: $Z_{near} = A_{near}$;

Far clipping distance: $Z_{far} = A_{far}$;

Left boundary of near clipping plane:

$$Z_{left} = Z_{near} \times \tan\beta_{left} \times \frac{1}{n} \times \left(\frac{(2 \times Z_x - m)}{m}\right);$$

Right boundary of near clipping plane:

$$Z_{right} = Z_{near} \times \tan\beta_{right} \times \frac{1}{n} \times \left(\frac{(2 \times Z_x + m)}{m}\right);$$

obtaining parameters of projection matrix of the target region based on the obtained boundary values of the target region according to below equations:

$$\begin{cases} x = 2 \times Z_{near} / (Z_{right} - Z_{left}) \\ y = 2 \times Z_{near} / (Z_{up} - Z_{down}) \\ a = (Z_{right} + Z_{left}) / (Z_{right} - Z_{left}) \\ b = (Z_{up} + Z_{down}) / (Z_{up} - Z_{down}) \\ c = -(Z_{far} + Z_{near}) / (Z_{far} - Z_{near}) \\ d = -(2.0 \times Z_{far} \times Z_{near}) / Z_{far} - Z_{near}) \\ e = -1 \end{cases};$$

and obtaining the projection matrix $Z_m$ of the target region based on the obtained parameters of the projection matrix of the target region:

$$Z_m = \begin{pmatrix} x & 0 & a & 0 \\ 0 & y & b & 0 \\ 0 & 0 & c & d \\ 0 & 0 & e & 0 \end{pmatrix}.$$

* * * * *